(No Model.)
G. E. HIBBARD.
VALVE FOR AUTOMATIC FIRE EXTINGUISHERS.
No. 599,099. Patented Feb. 15, 1898.
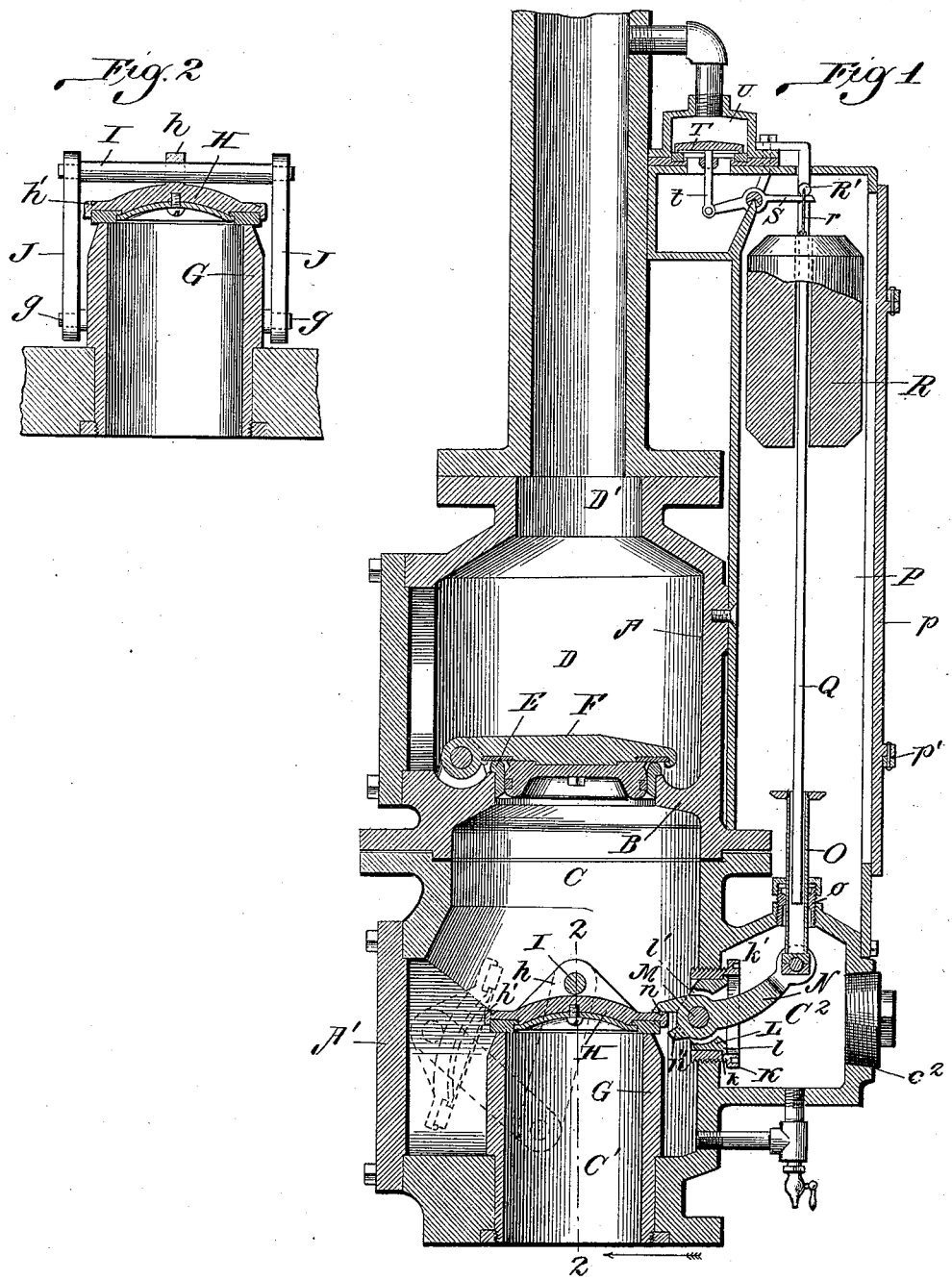
Witnesses.
John L. Tunison.
J. Cross.
Inventor.
George E. Hibbard
By his attorneys
Gridley & Hopkins

UNITED STATES PATENT OFFICE.

GEORGE E. HIBBARD, OF CHICAGO, ILLINOIS.

VALVE FOR AUTOMATIC FIRE-EXTINGUISHERS.

SPECIFICATION forming part of Letters Patent No. 599,099, dated February 15, 1898.

Application filed September 28, 1896. Serial No. 607,151. (No model.)

*To all whom it may concern:*

Be it known that I, GEORGE E. HIBBARD, a citizen of the United States, residing at Chicago, in the county of Cook and State of Illinois, have invented certain new and useful Improvements in Valves for Automatic Fire-Extinguishers, of which the following is a specification, reference being had to the accompanying drawings, which are made a part hereof, and in which—

Figure 1 is a vertical section of a valve embodying the invention. Fig. 2 is a section of a portion thereof on the line 2 2, Fig. 1.

The invention consists in the features of novelty that are particularly pointed out in the claims hereinafter.

A represents the valve-casing, the interior of which is divided by a diaphragm B into two chambers C and D, which communicate through an opening formed through the diaphragm and surrounded by a valve-seat E, the opening being controlled by a valve F, which is located within the chamber D and seats toward the chamber C. The chamber D has an outlet-opening D', with which communicates the riser or pipe for conveying the water to the system of distributing-pipes which are arranged in the building to be protected. It will be understood that these distributing-pipes are provided at intervals in the customary manner with sprinkler-heads, which normally close them air-tight and which open when subjected to a predetermined degree of heat. In what is technically known as a "dry-pipe" system the distributing-pipes and of course the chamber D' are filled with compressed air, and this is true of a system in which a valve embodying the present invention is used.

The chamber C is provided with an inlet-opening C', with which communicates the supply-pipe. Projecting into the interior of the chamber C and surrounding the opening C' is a short pipe or ring G, upon which is formed a seat for the valve H, by which the admission of water to the system is controlled. The valve is provided upon its top side with a perforated ear $h$, through which passes a bolt or pin I, the ends of which occupy eyes in the upper ends of a pair of links J, whose lower ends have eyes occupied by studs or trunnions $g$, which project from the sides of the valve-seat ring G. The links are freely movable upon the studs $g$, and the valve is freely movable about the axis of the bolt or pin I, and this latter movement may be provided for either by permitting the bolt or pin to turn within the eye of the ear $h$ or within the eyes of the links J, or both. Preferably the axis of the bolt or pin I occupies, when the valve is seated, a diametrical plane of the valve and valve-seat; but the studs $g$ are so located that their common axis is at one side of this plane, so that when the valve is seated the links extend in a direction that crosses the plane of the valve and that is nearly parallel with the line of force that is exerted upon the under side of the valve by the water in the supply-pipe. As a consequence of this arrangement the water exerts but little lateral force upon the links J, and hence it requires but little force applied laterally to said links to hold the valve firmly seated, and this holding force is applied to the valve by means presently described.

$C^2$ is an auxiliary chamber which communicates with the chamber C through a threaded opening, in which is screwed a hollow bushing K, which is accessible through an opening $c^2$, formed through one of the walls of the chamber $C^2$ and normally closed by a screw-plug. The interior of this bushing is cylindrical, and it is counterbored to form a shoulder $k$. Within it fits a ring L, provided with a flange $l$, which engages the shoulder $k$ and prevents the ring L from slipping through the bushing K and into the chamber C. This ring is provided with a pair of ears $l'$, which are perforated for the reception of a pin M, which passes through and forms the fulcrum of a lever N. One arm of the lever is bifurcated and projects into the chamber C, and one of its branches N' is provided with a tooth $n$, that engages a shoulder $h'$, that is formed on the top of the valve H. The other arm of the lever projects into the chamber $C^2$ and is pivotally connected to the lower end of a hollow stem O, which passes through a stuffing-box $o$ at the top of the chamber $C^2$ and into a housing P, which is secured to the side of the valve-casing. Within this housing is a centrally-located guide-rod Q, which extends from the top to the bottom thereof and passes through a weight R, which is suspended from one arm of a lever S by means of a link r, having its lower end pivotally connected to the weight and having its upper end journaled to a roller R', which rests upon the top side of the lever. Normally the arm of the lever upon which this roller R' rests inclines downward toward the fulcrum of the lever, so that the roller tends toward said fulcrum, the lever being held in this position by the pressure of the air within the distributing system operating through a valve or piston T and a rod t, projecting from the piston and pivotally connected to the other arm of the lever S. The piston or valve T fits within a chamber U, which is in communication with the system, so that the pressure within the chamber is the same as the pressure within the system, and the area of the piston which is exposed to this pressure is sufficient to enable the pressure to hold the weight normally elevated, the pressure against the under side of the piston being atmospheric.

A valve thus constructed may be set for automatic operation as follows: The supply of water to the opening C' should first be cut off by closing a gate (not shown) in the supply-pipe. By removing the cap A' of a handhole opening into the chamber C access may be had to the interior of the chamber and the valve H put in place upon its seat. The bushing K, to which access may be had through the opening $c^2$, may then be screwed in toward the chamber C until the tooth n on the lever N is brought to engagement with the shoulder on the top of the valve H. The bushing K is then screwed in the reverse direction— i. e., toward the chamber $C^2$—so as to draw the lever N, and consequently the valve H, in this direction, which may be done with sufficient force to hold the valve seated as against any pressure that will be exerted upon it by the water in the main. For accomplishing this backward movement of the bushing K it is provided with a series of holes k' in its outer end for receiving the prongs of a forked wrench. When the valve is thus tightened upon its seat, the cap A' and the plug of the opening $c^2$ are replaced. Air is then forced into the distributing-pipes until the desired pressure is reached, which, as before stated, will produce sufficient pressure upon the upper side of the valve or piston T to sustain the weight R, acting through the lever S. The weight R is then elevated and suspended from the lever S, and in order to gain access to it for this purpose one of the sides p of the housing P is in the nature of a door swinging upon hinges p'.

Upon a reduction of the pressure within the distributing system incident to the opening or firing of one or more sprinkler-heads the weight R will overcome the pressure upon the top side of the piston T and will fall. In doing so it will strike upon the upper end of the stem O and, forcing said stem downward, will rock the lever N upon its fulcrum, so as to disengage the tooth n from the valve H, and in addition the prong n" of the bifurcated end of the lever will engage the under side of the valve and pry it from its seat with great force. This impact of the lever N against the valve and the pressure of the water against its under side will cause the valve to be displaced and thrown into the position indicated by dotted lines in Fig. 1.

Having thus described my invention, the following is what I claim as new therein and desire to secure by Letters Patent:

1. In a valve for automatic fire-extinguishers, the combination of a casing having an inlet, a valve-seat surrounding said inlet, a valve for controlling said inlet, means including a swinging device for holding the valve seated, said swinging device being so disposed that a line drawn through its axis of motion and through its point of engagement with the valve will be nearly parallel with the line of force exerted upon the under side of the valve, and means conditioned to operate upon a reduction of the pressure in the system for releasing the valve, substantially as set forth.

2. In a valve for automatic fire-extinguishers, the combination of a casing having an inlet and an outlet, a valve adapted to close said inlet, links engaging the valve and pivoted at such points that when the valve is seated the links extend in a direction that crosses the plane of the valve and that is nearly parallel with the line of force exerted upon the under side of the valve, means for holding the valve normally seated in opposition to said force, and means conditioned to operate upon a reduction of the pressure in the system for releasing the valve, substantially as set forth.

3. In a valve for automatic fire-extinguishers, the combination of a casing having an inlet and an outlet, pivoted links, a valve pivoted to said links and adapted to close the inlet, the pivots of the links being so located that when the valve is seated the links extend in a direction that crosses the plane of the valve and is nearly parallel with the line of force exerted upon the under side of the valve, means for holding the valve seated said means being arranged to exert force in a direction which is transverse to the links, and means conditioned to operate upon a reduction of the pressure in the system for releasing the valve, substantially as set forth.

4. In a valve for automatic fire-extinguishers, the combination of a casing having an inlet, a valve adapted to close said inlet, pivoted links to which the valve is connected said links being so disposed that when the valve is seated they extend in a direction which crosses the plane of the valve and which is nearly parallel with the line of force exerted upon the under side of the valve, means including a screw for exerting force upon the valve in a direction which is transverse to the direction of the links, and means conditioned to operate upon a reduction of the pressure in the system for releasing the valve, substantially as set forth.

5. In a valve for automatic fire-extinguishers, the combination of a casing having an inlet, a valve for closing the inlet, pivoted links to which the valve is connected said links being so disposed that when the valve is seated they extend in a direction which crosses the plane of the valve, a screw disposed with its axis transverse to the links, means for connecting the screw and valve whereby the screw is adapted to exert a pressure upon the valve, and means conditioned to operate upon a reduction of the pressure in the system for releasing the valve, substantially as set forth.

6. In a valve for automatic fire-extinguishers, the combination of a casing having an inlet, a valve for closing said inlet, pivoted links to which the valve is connected, a lever engaging the valve, means for producing upon the lever a strain which is transmitted to the valve in a direction which is transverse to the links, and means conditioned to operate upon the reduction of the pressure in the system for tripping the lever and thereby releasing the valve, substantially as set forth.

7. In a valve for automatic fire-extinguishers, the combination of a casing having an inlet, a valve, pivoted links to which the valve is connected, a lever disposed within the valve-casing and having a portion projecting beneath the valve and adapted to engage directly therewith, a weight, and means controlled by the pressure in the system for holding the weight normally elevated, the weight and lever being so disposed that when the weight falls it actuates the lever and causes the lever to engage directly with the valve and throw it from its seat, substantially as set forth.

8. In a valve for automatic fire-extinguishers, the combination of a casing having an inlet, a valve closing said inlet, links to which the valve is connected, a lever engaging the valve, a screw-threaded bushing disposed with its axis transverse to the links, and a ring, supported by the bushing, to which the lever is fulcrumed, substantially as set forth.

9. In a valve for automatic fire-extinguishers, the combination of a casing having an inlet, a valve for closing the inlet, links to which the valve is connected, a lever N engaging the valve, a ring L to which the lever is fulcrumed, a screw-threaded bushing K engaging the lever, and means conditioned to operate upon a reduction of the pressure in the system for tripping the lever and releasing the valve, said means including a weight which is held normally elevated, substantially as set forth.

10. In a valve for automatic fire-extinguishers, the combination of a casing having an inlet, a valve for closing said inlet, a bifurcated lever one arm of which normally engages the valve for holding it seated the other arm of which is adapted to engage the valve, when the lever is tripped, for unseating it, and means conditioned to operate upon a reduction of the pressure in the system for tripping the lever, substantially as set forth.

GEORGE E. HIBBARD.

Witnesses:
L. M. HOPKINS,
N. C. GRIDLEY.